(12) United States Patent
Wood et al.

(10) Patent No.: US 11,500,864 B2
(45) Date of Patent: Nov. 15, 2022

(54) GENERATING HIGHLIGHT QUERIES

(71) Applicant: International Business Machines Corporation, Armonk, NY (US)

(72) Inventors: John Jesse Wood, St Albans (GB); Michael Kirwan, Cambridge (GB); Gareth James Hugh Morgan, Loughton (GB); Pierre Pook, Cambridge (GB); Kristian Memarzia, Leeds (GB); Zachary Charles Beckett Pywell, Stamford (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 46 days.

(21) Appl. No.: 17/112,655

(22) Filed: Dec. 4, 2020

(65) Prior Publication Data
US 2022/0179851 A1    Jun. 9, 2022

(51) Int. Cl.
| | | |
|---|---|---|
| *G06F 17/00* | (2019.01) | |
| *G06F 7/00* | (2006.01) | |
| *G06F 16/242* | (2019.01) | |
| *G06N 3/04* | (2006.01) | |
| *G06N 3/08* | (2006.01) | |
| *G06F 16/2457* | (2019.01) | |

(52) U.S. Cl.
CPC .... *G06F 16/2423* (2019.01); *G06F 16/24578* (2019.01); *G06N 3/04* (2013.01); *G06N 3/084* (2013.01)

(58) Field of Classification Search
CPC . G06F 16/2423; G06F 16/24578; G06N 3/04; G06N 3/084

USPC ........................................................ 707/609
See application file for complete search history.

(56) References Cited

U.S. PATENT DOCUMENTS

| | | |
|---|---|---|
| 8,131,779 B2 | 3/2012 | Jonker et al. |
| 10,394,896 B2 | 8/2019 | Broyd et al. |
| (Continued) | | |

OTHER PUBLICATIONS

Mell et al., "Effectively and Securely Using the Cloud Computing Paradigm" dated Oct. 7, 2009, NIST, Information Technology Laboratory, Total 80 pages.

(Continued)

*Primary Examiner* — Pavan Mamillapalli
(74) *Attorney, Agent, or Firm* — Konrad Raynes Davda & Victor LLP; Janaki K. Davda

(57) ABSTRACT

Provided are techniques for generating highlight queries. Data is analyzed using one or more schemas to identify patterns and frequencies of the patterns in the data. The patterns and the frequencies of the patterns are stored in a global patterns structure. A graph is analyzed to identify one or more of the patterns in the global patterns structure that are present in the graph and in which frequencies. The identified one or more of the patterns in the global patterns structure that are present in the graph are added to a per-user patterns structure with the frequencies of those patterns. The patterns in the per-user patterns structure are scored. A subset of the patterns in the per-user patterns structure that have scores above a threshold are selected as highlight queries. The selected subset of the patterns are executed as highlight queries to generate results, and the results are returned.

20 Claims, 19 Drawing Sheets

(56) References Cited

U.S. PATENT DOCUMENTS

| | | | |
|---|---|---|---|
| 2004/0225629 A1* | 11/2004 | Eder | G06N 5/022 |
| | | | 706/45 |
| 2007/0061242 A1* | 3/2007 | Ramer | G06Q 30/0255 |
| | | | 705/37 |
| 2012/0158633 A1 | 6/2012 | Eder | |
| 2012/0185821 A1* | 7/2012 | Yaseen | G06F 8/35 |
| | | | 717/104 |
| 2013/0103677 A1* | 4/2013 | Chakra | G06F 16/904 |
| | | | 707/723 |
| 2015/0142827 A1* | 5/2015 | Hasan | G06F 16/95 |
| | | | 707/748 |
| 2015/0178273 A1* | 6/2015 | Hakkani-Tur | G06F 40/40 |
| | | | 704/9 |
| 2015/0278355 A1 | 10/2015 | Hassanpour et al. | |
| 2015/0379414 A1* | 12/2015 | Yeh | G06N 5/022 |
| | | | 706/46 |
| 2017/0097984 A1* | 4/2017 | Haidar | G06F 16/288 |
| 2018/0107695 A1* | 4/2018 | Yang | G06F 16/2282 |
| 2020/0050604 A1 | 2/2020 | Tung et al. | |

OTHER PUBLICATIONS

Mell et al., "The NIST Definition of Cloud Computing" dated Sep. 2011, Recommendations of the National Institute of Standards and Technology, Computer Security Division Information Technology Laboratory National Institute of Standards and Technology Gaithersburg, Total 7 pages.

* cited by examiner

| Graph | Pattern A - Normalized Frequency | Pattern B - Normalized Frequency | Pattern C - Normalized Frequency |
|---|---|---|---|
| 1 | 0.25 | 0.3 | 0 |
| 2 | 0 | 0.2 | 0.1 |
| 3 | 0.4 | 0.25 | 0 |

FIG. 7

| Pattern | Normalized Frequency |
|---|---|
| A | 0.1 |
| B | 0.15 |
| C | 0.2 |

Nodes
Person
Vehicle
Organization
Location
Event
Bank account
Social media account
Mobile phone
Laptop
Website

Edges
Ownership
Access
Employee
Associate of
Relative of
Friend of
Email
Transaction
Involved in
Phone call
Short message service
Social media post

| Pattern | Frequency |
|---|---|
| 1 | 500 |
| 2 | 45 |
| 3 | 15 |
| . . . | |

| Patterns found in graph | Frequency |
|---|---|
| 1 | 4 |
| 2 | 5 |
| 3 | 15 |
| . . . | |

FIG. 14

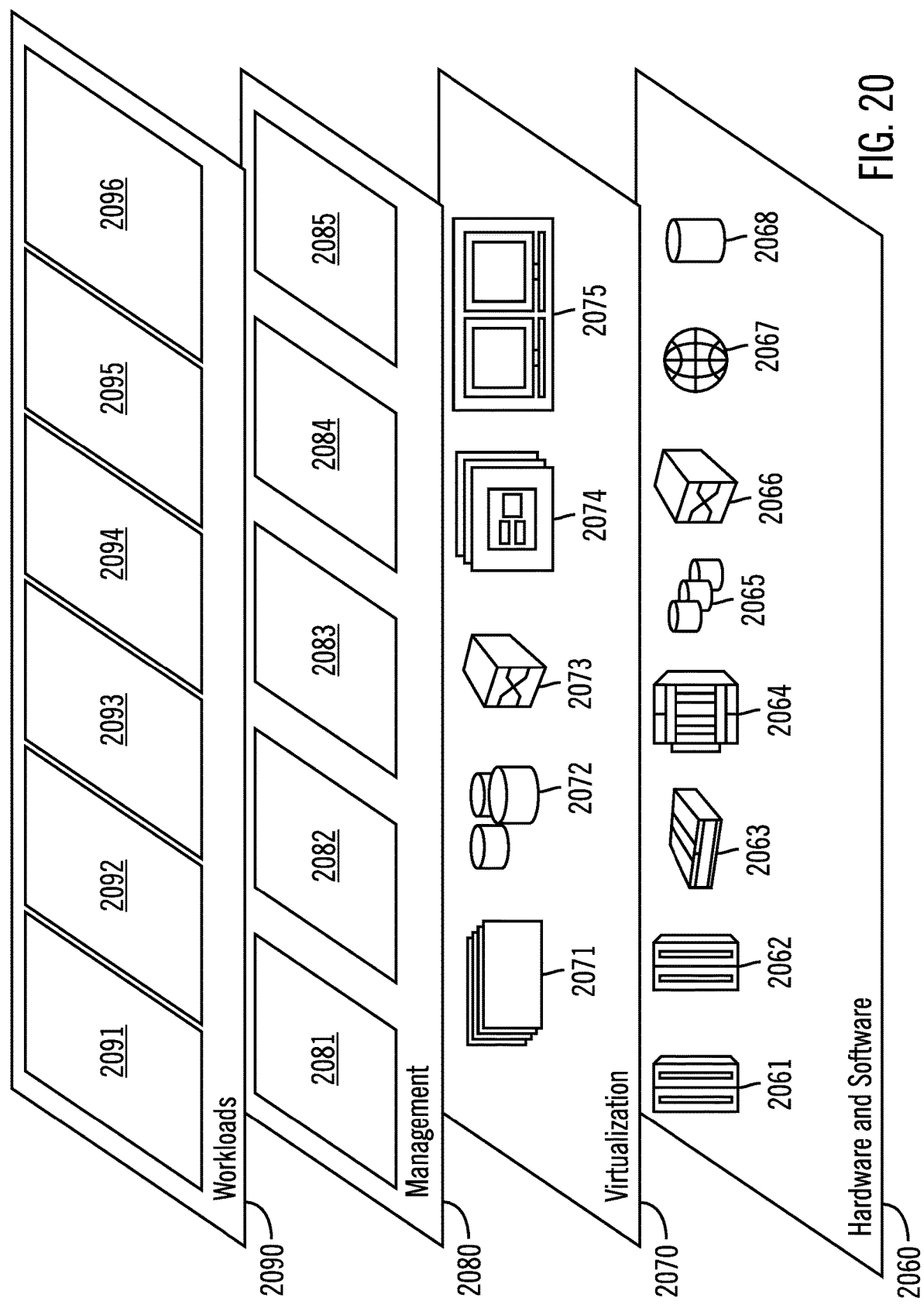

GENERATING HIGHLIGHT QUERIES

BACKGROUND

Embodiments of the invention relate to generating highlight queries (e.g., for analysts) and executing those highlight queries. The highlight queries may be generated per a specific user or a group.

A graph has nodes and edges. A graph may also be referred to as a chart. The nodes represent entities (e.g., people, groups, accounts, objects, etc.) and edges represent connections (e.g., ownership, relative, employee, etc.) between nodes. The connections may be described as links or relationships between entities.

Analysts explore graphs with entities and connections. When looking at any entity, they often want to explore the local network/graph around that entity. Highlight queries may be described as a tool that helps with this exploration.

A highlight query takes a starting entity and runs a query over the graphs with that entity as a seed for the query. The highlight query is a graphical query that may be represented as a sub-graph with conditional statements on the elements (where elements include both nodes and edges) within the sub-graph.

SUMMARY

In accordance with certain embodiments, a computer-implemented method is provided for generating highlight queries. The computer-implemented method comprises operations. Data is analyzed using one or more schemas to identify patterns and frequencies of the patterns in the data, wherein each of the patterns comprises one or more node types and one or more edge types. The patterns and the frequencies of the patterns are stored in a global patterns structure. A graph is analyzed to identify one or more of the patterns in the global patterns structure that are present in the graph and in which frequencies. The identified one or more of the patterns in the global patterns structure that are present in the graph are added to a per-user patterns structure with the frequencies of those patterns. The patterns in the per-user patterns structure are scored. A subset of the patterns in the per-user patterns structure that have scores above a threshold are selected as highlight queries. The selected subset of the patterns are executed as highlight queries to generate results, and the results are returned.

In accordance with other embodiments, a computer program product is provided for generating highlight queries. The computer program product comprises a computer readable storage medium having program code embodied therewith, the program code executable by at least one processor to perform operations. Data is analyzed using one or more schemas to identify patterns and frequencies of the patterns in the data, wherein each of the patterns comprises one or more node types and one or more edge types. The patterns and the frequencies of the patterns are stored in a global patterns structure. A graph is analyzed to identify one or more of the patterns in the global patterns structure that are present in the graph and in which frequencies. The identified one or more of the patterns in the global patterns structure that are present in the graph are added to a per-user patterns structure with the frequencies of those patterns. The patterns in the per-user patterns structure are scored. A subset of the patterns in the per-user patterns structure that have scores above a threshold are selected as highlight queries. The selected subset of the patterns are executed as highlight queries to generate results, and the results are returned.

In accordance with yet other embodiments, a computer system is provided for generating highlight queries. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. Data is analyzed using one or more schemas to identify patterns and frequencies of the patterns in the data, wherein each of the patterns comprises one or more node types and one or more edge types. The patterns and the frequencies of the patterns are stored in a global patterns structure. A graph is analyzed to identify one or more of the patterns in the global patterns structure that are present in the graph and in which frequencies. The identified one or more of the patterns in the global patterns structure that are present in the graph are added to a per-user patterns structure with the frequencies of those patterns. The patterns in the per-user patterns structure are scored. A subset of the patterns in the per-user patterns structure that have scores above a threshold are selected as highlight queries. The selected subset of the patterns are executed as highlight queries to generate results, and the results are returned.

BRIEF DESCRIPTION OF THE SEVERAL VIEWS OF THE DRAWINGS

Referring now to the drawings in which like reference numbers represent corresponding parts throughout:

FIG. 7 illustrates an example per-user patterns structure in accordance with certain embodiments.

FIG. 8 illustrates an example global patterns structure in accordance with certain embodiments.

FIG. 9 illustrates an example schema for data in accordance with certain embodiments.

FIG. 12 illustrates an example global patterns frequency structure in accordance with certain embodiments.

FIG. 14 illustrates an example per-user patterns structure in accordance with certain embodiments.

FIG. 20 illustrates abstraction model layers in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Given a schema and data, embodiments configure out-of-the box highlight queries for use as the utility depends, based on the schema, the data, and the scenario in which the data is being used. The data may take the form of any entities and connections (e.g., any connection entity structure).

Figure 1:
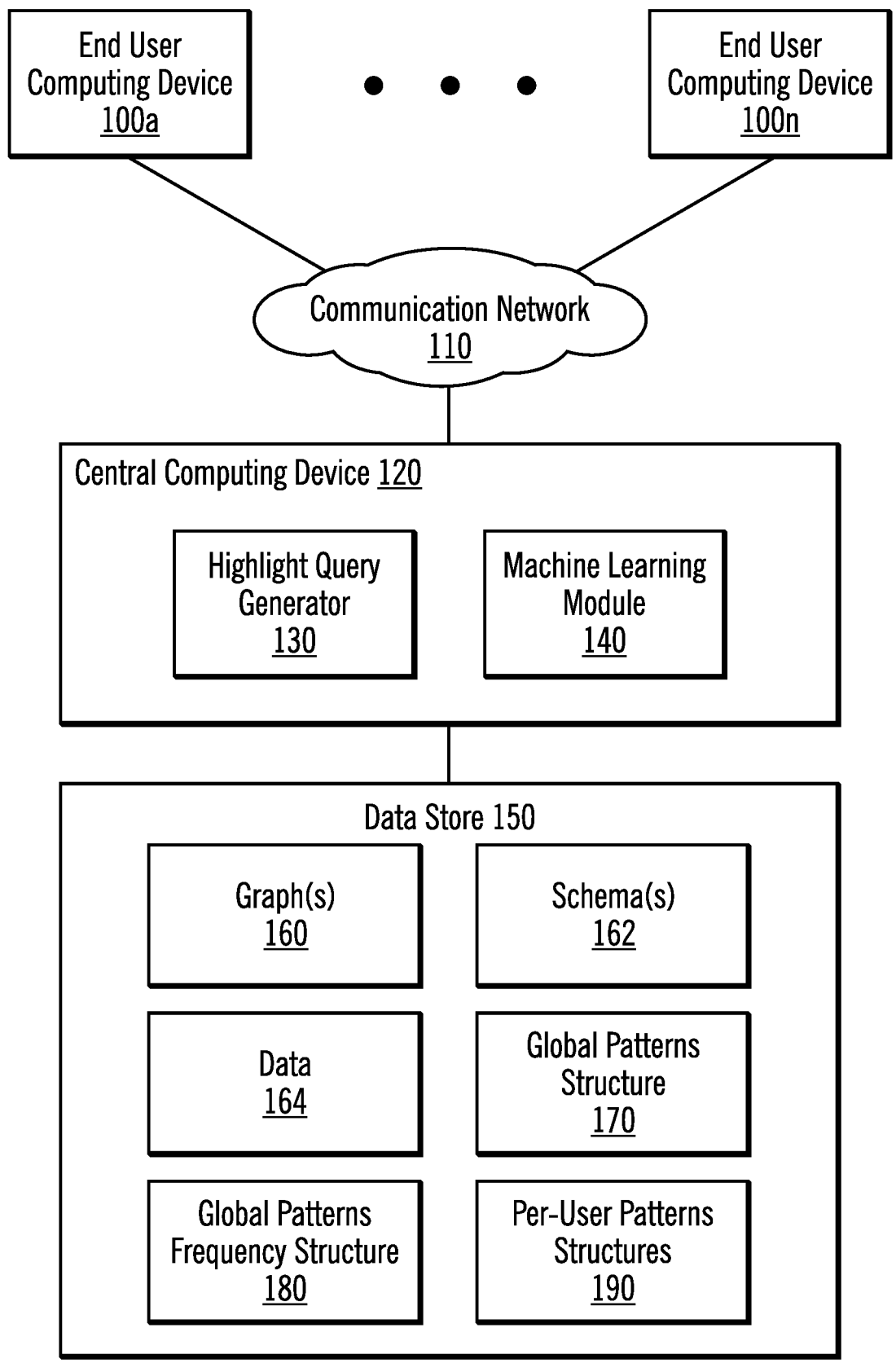
FIG. 1 illustrates, in a block diagram, a computing environment in accordance with certain embodiments.

FIG. 1 illustrates, in a block diagram, a computing environment in accordance with certain embodiments. One or more end-user computers 100a . . . 100n are coupled via a communication network 110 to a central computing device 120. The central computing device 120 is coupled to a data store 150. The data store 150 may be located physically close to the central computing device 120 or may be located physically remote to the central computing device 120 (e.g., through communication network 110 or another communication network).

The central computing device 120 includes a highlight query generator 130 and a machine learning module 140. The data store 150 includes one or more graphs 160, one or more schemas 162, data 164, a global patterns structure 170 (with patterns from the data 164, which may be referred to as "global" patterns), a global patterns frequency structure 180 (with patterns and the frequency of each of the patterns, where the patterns may be referred to as "global" patterns), and per-user patterns structures 190 (with patterns and the frequency of each of the patterns, where the patterns may be referred to as "local" or "user" patterns and are identified using graphs 160 created by users at either the central computing device 120 or at an end-user computing device 100a . . . 100n). In certain embodiments, the frequency in the global patterns frequency structure 180 represents a distribution and is a number of times the pattern occurs in the data 164. In certain embodiments, the frequency in the per-user patterns structures 190 represents a distribution and is a number of times the pattern occurs in the graph.

The data 164 may be described as schema-aligned because the data 164 includes nodes and edges that are separated based on the one or more schemas 162. The global patterns frequency structure 180 may also be referred to as a patterns summary. In certain embodiments, the patterns and the frequency of the patterns may be stored in one structure (e.g., one structure may include the information from the global patterns structure 170 and the global patterns frequency structure 180).

The highlight query generator 130 runs a series of static analyses over the data 164 to identify patterns in the data 164 and the frequency of those patterns across entity types (e.g., entity classes, such as people, groups, cars, planets, etc.). In certain embodiments, the series of static analyses may be derived from a schema 162. The schema 162 dictates allowed edges between nodes and lists the available node and edge types. The static analyses takes the schema 162 and iterates through the node types calculating legal patterns. For example, given a schema that has 3 node types (N1, N2, N3) and two edge types (E1,E2), where N1 may be linked via E1, N2 may be linked by either E1 or E3, and N3 may be linked via E2, the static analyses by the highlight query generator 130 determines that the following are valid pattern types:

N1-E1-N1
N1-E1-N2
N1-E1-N1-E1-N1
N1-E1-N1-E1-N2
N1-E1-N2-E1-N1
N1-E1-N2-E1-N2
N1-E1-N2-E2-N2
N1-E1-N2-E2-N3
N1-E1-N2-E2-N2-E2-N3
. . .

Entity types may be described as categories of entities. In certain embodiments, entity types are schema aligned (e.g., defined by the schema).

The highlight query generator 130 then analyzes saved graphs for each user to understand which of those patterns appear on the user's graphs and with what frequency. Using this and the static analyses of the data 164 (e.g., the whole dataset), the highlight query generator 130 detects which patterns appear more often or less often than expected in a user's submitted queries. The queries that the user submits may be described as a behavior of that user. From this, the highlight query generator 130 infers which patterns the user is using to explore the dataset. These patterns are then stored as the user's highlight queries.

Figure 2:
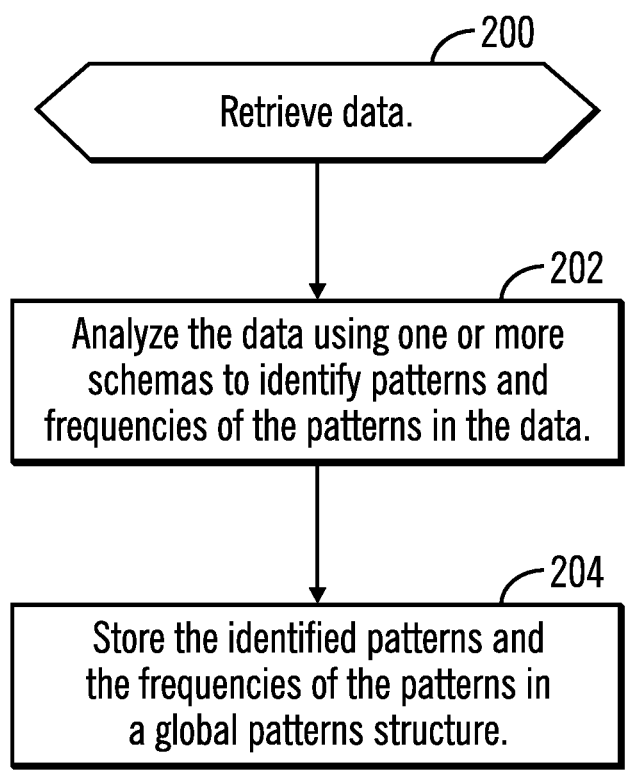
FIG. 2 illustrates, in a flowchart, initial processing of the data in accordance with certain embodiments.

FIG. 2 illustrates, in a flowchart, initial processing of the data in accordance with certain embodiments. Control begins at block 200 with the highlight query generator 130 retrieving the data 164. Prior to the retrieval, the data 164 is ingested (e.g., stored as the data 164 in the data store 100). In block 202, the highlight query generator 130 analyzes the data 164 using one or more schemas 162 to identify patterns and frequencies of the patterns in the data.

In block 204, the highlight query generator 130 stores the identified patterns and the frequencies of the patterns in a global patterns frequency structure 180.

Figure 3:
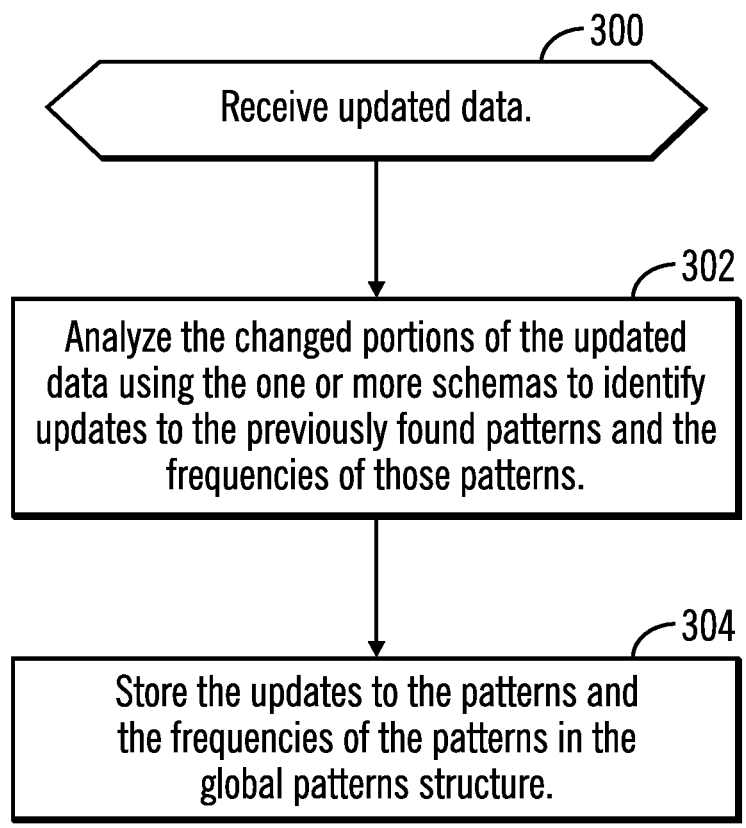
FIG. 3 illustrates, in a flowchart, processing of updated data in accordance with certain embodiments.

FIG. 3 illustrates, in a flowchart, processing of updated data in accordance with certain embodiments. Control begins at block 300 with the highlight query generator 130 receiving updated data 164. In certain embodiments, the data 164 is updated periodically. In block 302, the highlight query generator 130 analyzes the changed portions of the updated data 164 using the one or more schemas 162 to identify updates to the previously found patterns and the frequencies of those patterns. In block 304, the highlight query generator 130 stores the updated patterns and the updated frequencies of the patterns in the global patterns frequency structure 180.

Thus, the highlight query generator 130 analyzes the data 164 after ingestion and updates the analysis of the patterns and their relative frequencies in the data 164 when the data 164 is updated.

In certain embodiments, to perform the analysis of the data 164, the highlight query generator 130 selects each schema defined entity type in turn and, for each of the entities of that entity type in the data 164, explores the nodes (representing entities) and edges (representing connections) around the entities of that entity type up to n-steps away (where "n" is configurable by a user, such as a system administrator). For each entity type in the schema 162, the highlight query generator 130 builds up a set of patterns that link entities to each other. The highlight query generator 130 also counts these patterns to determine the frequency with which the patterns appear for each entity type in the schema 162. The highlight query generator 130 stores this information in the global patterns frequency structure 180.

Then, periodically, as the data 164 is updated, the highlight query generator 130 updates the information in the global patterns frequency structure 180. In certain embodiments, the highlight query generator 130 uses certain stored information on how the initial analysis (and any prior analysis) was run to analyze the updated portions of the data 164. For example, this may include re-running the analysis around the nodes of graphs where new nodes and/or new edges has been added, removed or modified and updating the global patterns structure based on this. In certain embodiments, new nodes and new edges are identified based on timestamps associated with the new nodes and the new edges. In certain embodiments, highlight queries start and end with nodes, so new nodes and edges that connect to existing nodes and edges may be affected by new data (new nodes and/or new edges), and new nodes may also act as new seeds for the highlight queries. In certain alternative embodiments, the highlight query generator 130 performs the analysis on the entire data 164.

Figure 4:
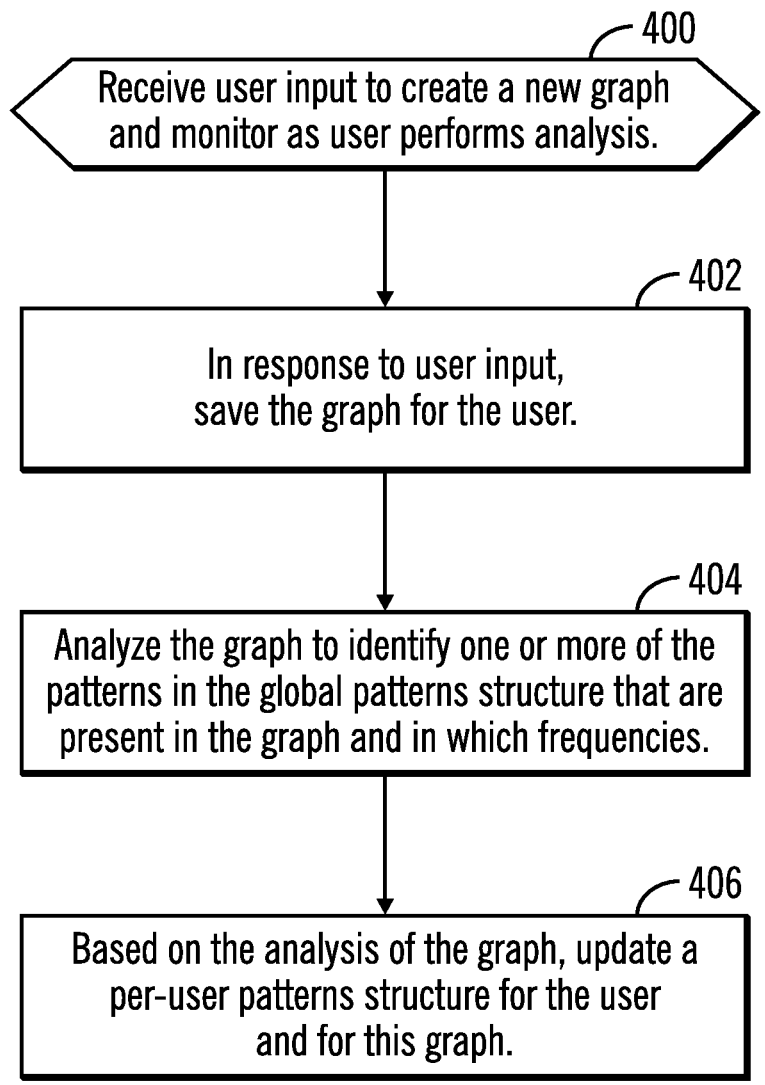
FIG. 4 illustrates, in a flowchart, operations for processing a new graph in accordance with certain embodiments.

FIG. 4 illustrates, in a flowchart, operations for processing a new graph in accordance with certain embodiments. Control begins at block 400 with the highlight query generator 130 receiving user input to create a new graph and monitoring as the user performs analysis. In certain embodiments, examples of analysis include: the user retrieving and curating a subset of the data in a workspace. For example, given a database of people, the user (e.g., an analyst) may search for a particular individual (person) by identifying characteristics of the person provided by a friend. That search leads to investigate several Person entities from the data. The user then extracts information about those person entities and the other things the person entities are connected to in the data. Potentially, the user has additional information, such as a vehicle owned by the person that they are looking for, and the user may use the additional information to identify the person.

In block 402, in response to user input, the highlight query generator 130 saves the graph for the user. In block 404, the highlight query generator 130 analyzes the graph to identify one or more of the patterns in the global patterns structure that are present in the graph and in which frequencies. In block 406, based on the analysis of the graph, the highlight query generator 130 updates a per-user patterns structure 190 for the user and for this graph. In certain embodiments, the per-user patterns structure 190 is a table with a row for each graph, and a row is added for each of the one or more patterns in the newly created graph, along with the frequency. The per-user patterns structure 190 is associated with one or more users (e.g., a group of users).

Figure 5A:
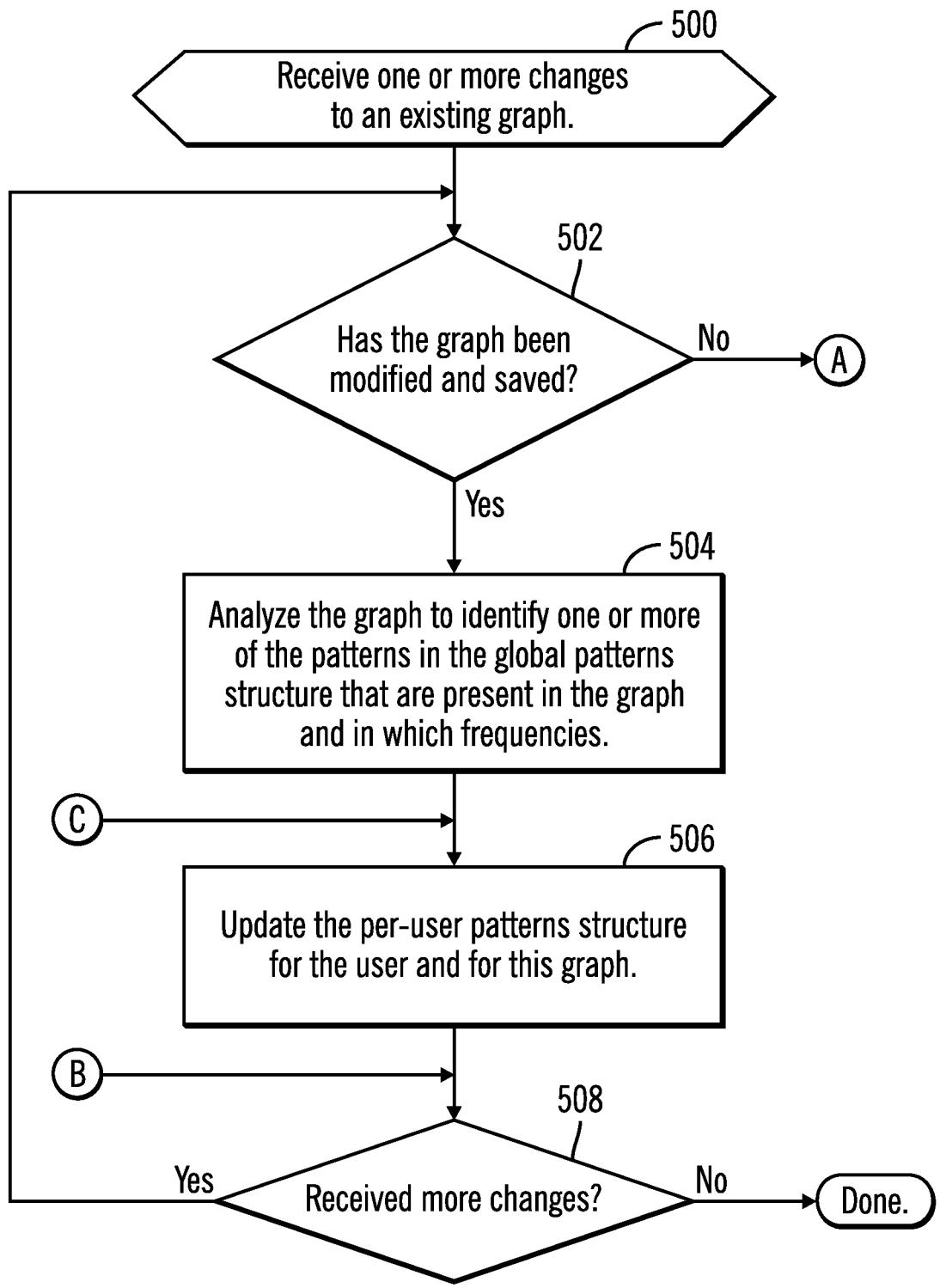
FIGS. 5A and 5B illustrate, in a flowchart, operations for updating an existing graph in accordance with certain embodiments.
Figure 5B:
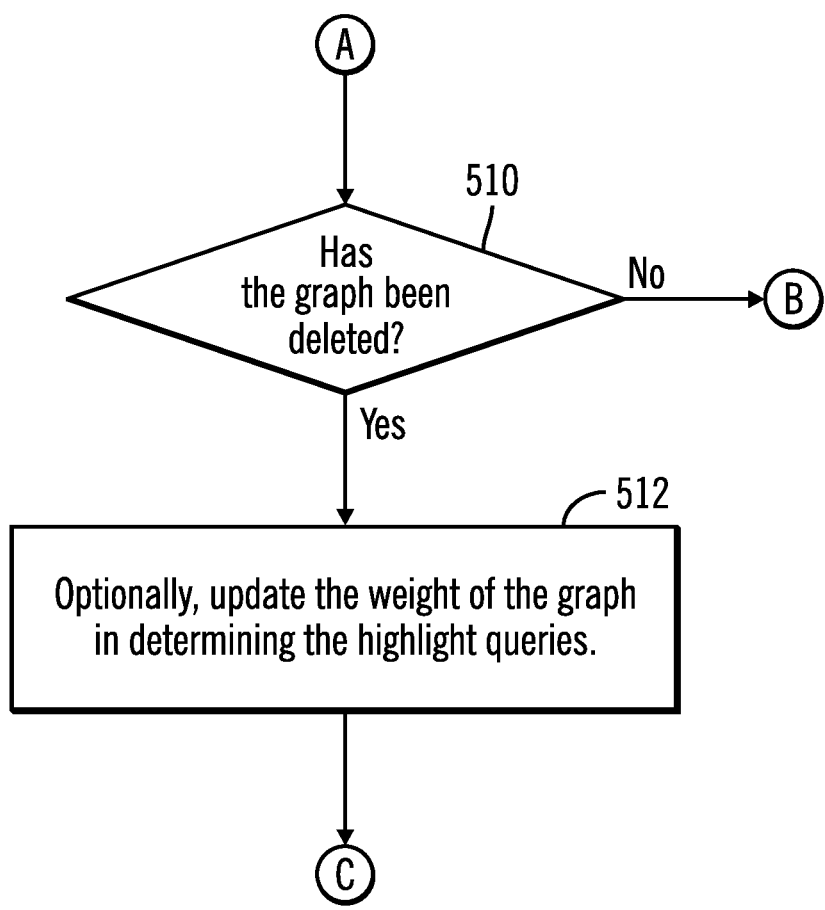

FIGS. 5A and 5B illustrate, in a flowchart, operations for updating an existing graph in accordance with certain embodiments. Control begins at block 500 with the highlight query generator 130 receiving one or more changes to an existing graph. In block 502, the highlight query generator 130 determines whether the graph been modified and saved. If so, processing continues to block 504, otherwise, processing continues to block 512 (FIG. 5B). In block 504, the highlight query generator analyzes the graph to identify one or more of the patterns in the global patterns structure 170 that are present in the graph and in which frequencies. In block 506, the highlight query generator 130 updates the per-user patterns structure 190 for the user and for this graph. The updating in block 506 may be based on the analysis of the graph in block 504 or may be from updating weights in block 512.

In block 508, the highlight query generator 130 provides suggestions for adding to the graph based on the identified patterns.

In various embodiments, the timing of when to use highlight queries to add additional information may change. In certain embodiments, the highlight query generator 130 may generate new highlight queries automatically on data retrieval. For example, when the user searching for a person identifies Person entities by characteristics, the highlight query generator 130 may have learned: person-ownership-vehicle and person-employee-organization-ownership vehicle. In this example, the highlight query generator 130 may automatically use the people added to the graph as seeds for additional queries with the vehicle and automatically add matches to the graph.

In block 510, the highlight query generator 130 determines whether more changes were received. If so, processing continues to block 502, otherwise, processing is done.

In block 512, the highlight query generator 130 determines whether the graph has been deleted. If so, processing continues to block 514, otherwise, processing continues to block 510 (FIG. 5A). In block 514, the highlight query generator 130 updates the weight of the graph in determining the highlight queries. In certain embodiments, the frequencies of patterns in the user's set of graphs may be weighted based on the use of that graph. If a graph has been deleted, the graph may be completely removed from determining which patterns are relevant to the user or may be given a lower rating than active graphs. The weight may be used when combining the frequency of patterns from different user graphs to determine which overall highlight queries are relevant to that user.

From block 514, processing continues to block 506 (FIG. 5A). In certain embodiments, the processing of block 514 is optional, and, if the weights are not updated, processing continues to block 502 (FIG. 5A).

Figure 6:
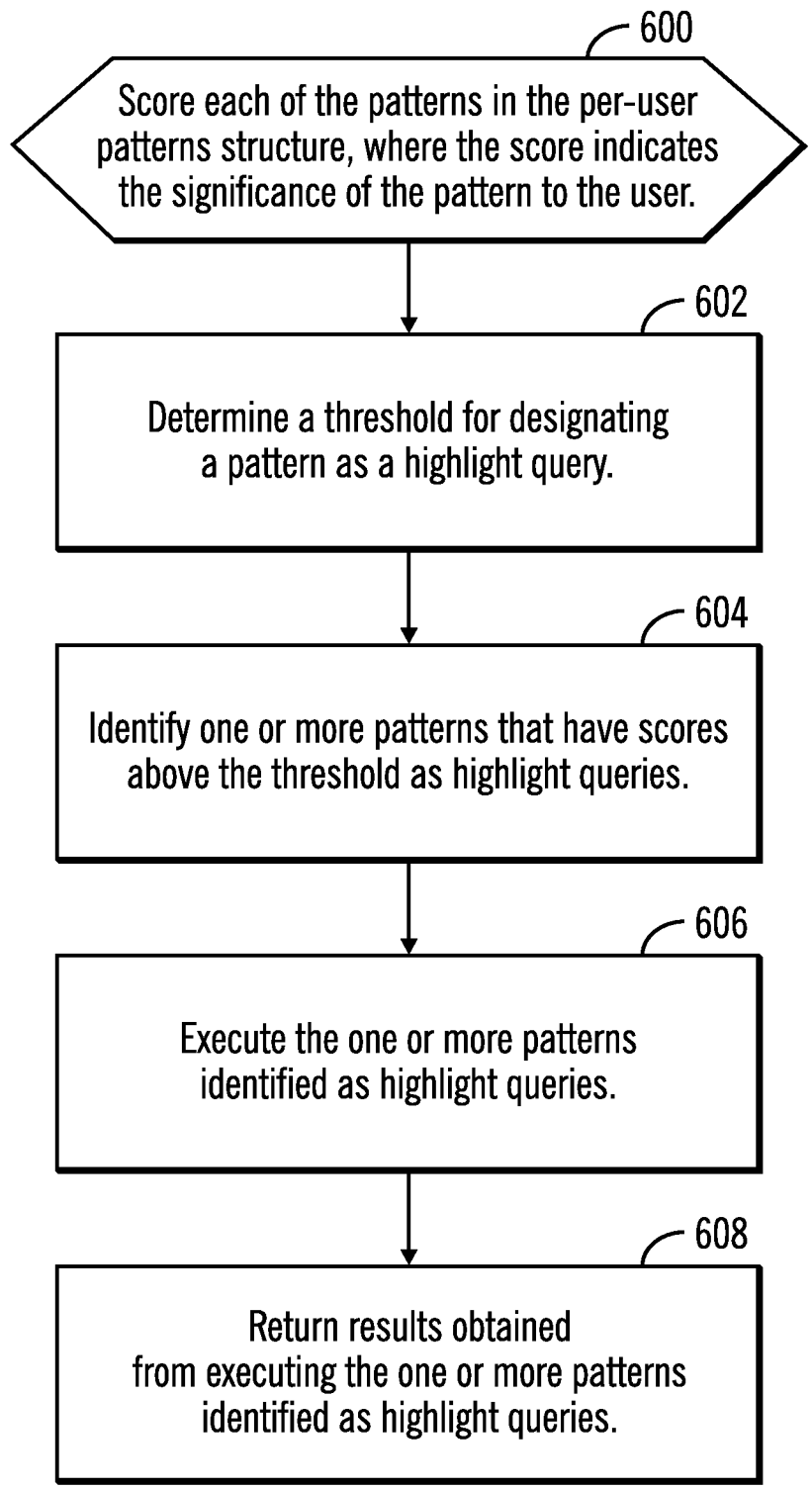
FIG. 6 illustrates, in a flowchart, operations for executing highlight queries in accordance with certain embodiments.

FIG. 6 illustrates, in a flowchart, operations for executing highlight queries in accordance with certain embodiments. Control begins at block 600 with the highlight query generator 130 scoring each of the patterns in the per-user patterns structure 190, where the score indicates the significance of the pattern to the user. In block 602, the highlight query generator 130 determines a threshold for designating a pattern as a highlight query. With embodiments, the patterns having scores above the threshold indicate that the patterns are to be designated as highlight queries. In block 604, the highlight query generator 130 identifies one or more patterns (i.e., a subset of patterns) that have scores above the threshold as highlight queries. In block 606, the highlight query generator 130 executes the one or more patterns identified as highlight queries. In block 608, the highlight query generator 130 returns results obtained from executing the one or more patterns identified as highlight queries.

Thus, once the analysis of the data 164 is completed to identify patterns and frequencies, embodiments analyze graphs stored by a user (either newly created and saved or modified and saved) to determine what patterns the user is investigating. Embodiments identify certain of these patterns as highlight queries that are executed to provide results to the user.

In certain embodiments, to perform this analysis, the highlight query generator 130 uses the patterns stored in the global patterns structure 170 or the global patterns frequency structure 180 and creates an entry in a per-user patterns structure (e.g., a graph pattern summary table) for each graph the user has stored, detailing the frequency of each pattern. In certain embodiments, the processing is performed each time the global patterns structure is updated with new patterns and each time the graph is modified.

Using the information in the global patterns frequency structure 180 and in the per-user patterns structure 190, the highlight query generator 130 calculates the frequencies of the patterns that appear in the per-user patterns structure 190 and determines whether each of the patterns is appearing more or less frequently than expected given a set of the data 164 in the system. The highlight query generator 130 scores each pattern, on a per graph basis, with a number indicating the significance of the pattern to the user. In certain embodiments, the highlight query generator 130 does this using statistical distance measures between the frequency of the pattern in a per-user patterns frequency structure 190 and the frequency of the same pattern in the global patterns frequency structure 180. The highlight query generator 130 also defines a threshold above which a pattern is deemed significant. That is, a pattern having a score above the threshold is deemed statistically significant and is designated as a highlight query, while a pattern having a score below or equal to the threshold is deemed not statistically significant (or insignificant) and is not designated as a highlight query. In certain embodiments, the highlight query generator 130 includes both the significance of the statistical divergence of pattern frequency and the number of graphs a pattern occurs in to determine whether the pattern is to be considered a highlight query.

FIG. 7 illustrates an example per-user patterns structure 700 in accordance with certain embodiments. The per-user patterns structure 700 in this example is a table with a row for each graph that the user has created and with columns for each pattern associated with that graph. The per-user patterns structure 700 indicates a normalized frequency ("NF") of each pattern for each graph. Normalized may be described as, rather than counting patterns, determining the expected occurrence of a pattern given an amount of data on a graph.

The threshold for significance used and the statistical distance are both configurable. Depending on the sensitivity that is desired to the user's data, there may be more or fewer queries. In certain embodiments, the threshold varies based on the pattern (e.g., due to pattern length, which nodes or edges are in the pattern, etc.).

FIG. 8 illustrates an example global patterns structure 800 in accordance with certain embodiments. The global patterns structure 800 in this example is a table with a row for each pattern and with a column for a normalized frequency for each pattern.

In this example, using the per-user patterns structure 700 and the global patterns structure 800, the highlight query generator 130 determines the threshold as:

A pattern has a distance of at least 0.1 from the expected normalized frequency in at least 2 graphs, or a distance of at least 0.05 from the expected normalized frequency in 3 graphs.

Embodiments compare the frequency of the pattern with the anticipated frequency given the amount of data in the graph. Continuing with this example, for Pattern A, in both graphs 1 and 3 the distance from the expected frequency of the pattern is greater than 0.1, and so the highlight query generator 130 designates Pattern A as a highlight query. For Pattern B, the distance from the expected frequency of Pattern B is greater than 0.05 in the three graphs, and so the highlight query generator 130 designates Pattern B as a highlight query. On the other hand, Pattern C is seen only in graph 2, and so the highlight query generator 130 does not designate Pattern C as a highlight query.

The use of the per-user patterns structure 700 and the global patterns structure 800 is one embodiment for determining the significance of patterns and deciding which of the patterns are to be designated as highlight queries.

In other embodiments, the highlight query generator 130 uses the per-user patterns structure 700 as a training (test) set for training the machine learning module 140 (e.g., a machine learning classifier), and the machine learning module 140 determines appropriate thresholds, given a number of (e.g., 5) highlight queries.

An example is provided herein with reference to FIGS. 9-15 merely to enhance understanding of embodiments.

FIG. 9 illustrates an example schema 900 for data in accordance with certain embodiments. The schema 900 separates the data into nodes (for entities) and edges (for connections). The schema 900 lists the allowable node and edge forms for the data.

The schema 900 also defines what connections are allowed between entity types. For example, an allowed connection between two person nodes may be an "Associate of" edge, a "Relative of" edge or a "Friend of" edge, but not a "Transaction" edge or other type of edge. Thus, there are certain allowable paths through the data.

Figure 10:
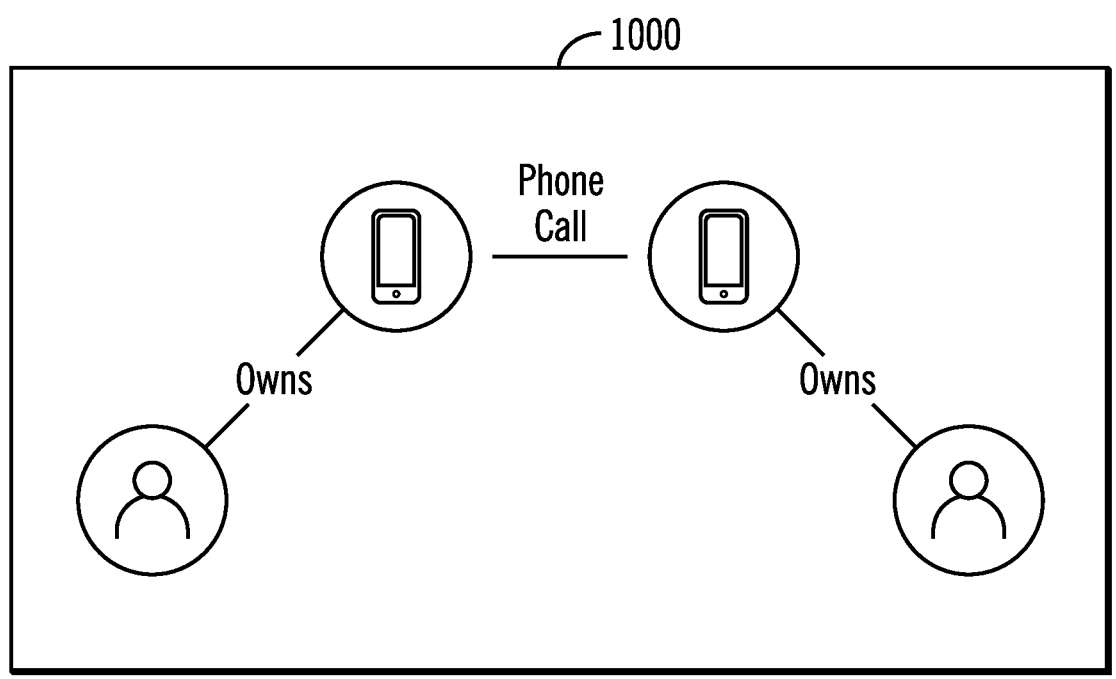
FIG. 10 illustrates example allowable paths through data in accordance with certain embodiments.

FIG. 10 illustrates example allowable paths 1000 through data in accordance with certain embodiments. In this example, users own phones, and the phones may make calls to each other.

Figure 11:
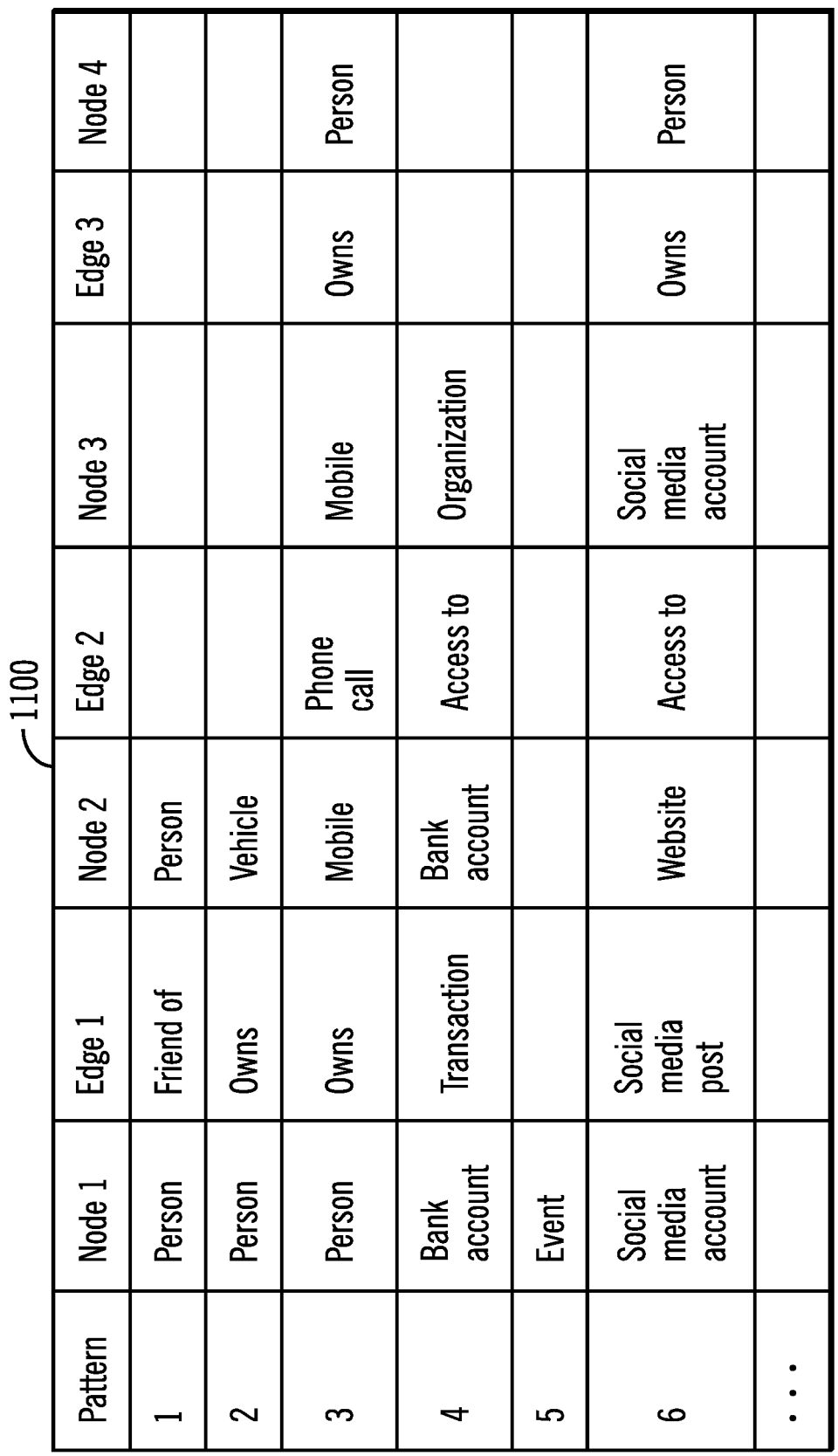
FIG. 11 illustrates an example global patterns structure in accordance with certain embodiments.

FIG. 11 illustrates an example global patterns structure 1100 in accordance with certain embodiments. The ellipses in the last row of the global patterns structure 1100 indicates that there may be additional rows. Each row of the global patterns structure 1100 identifies a pattern based on one or more node types and one or more edge types (as defined by the schema 162). The highlight query generator 130 initially determines the allowed patterns in the data using the schema 900 to build a set of the potential patterns from the schema 900. In certain embodiments, to avoid an infinite or very large set of patterns, there may also be a maximum length applied so that the highlight query generator 130 does not look for patterns with more than "n" nodes (e.g., 5 nodes) or include patterns that visit the same node more than once. In certain embodiments, the highlight query generator 130 ignores patterns below a certain length (e.g., ones that contain a single edge) as such patterns that may be too common to be meaningful.

FIG. 12 illustrates an example global patterns frequency structure 1200 in accordance with certain embodiments. The ellipses in the last row of the global patterns frequency structure 1200 indicates that there may be additional rows. The highlight query generator 130 scans the data and calculates statistics for the occurrences of the patterns in the data to generate the global patterns frequency structure 1200. The global patterns frequency structure 1200 has a row for each pattern and a column with the frequency of each pattern.

Figure 13:
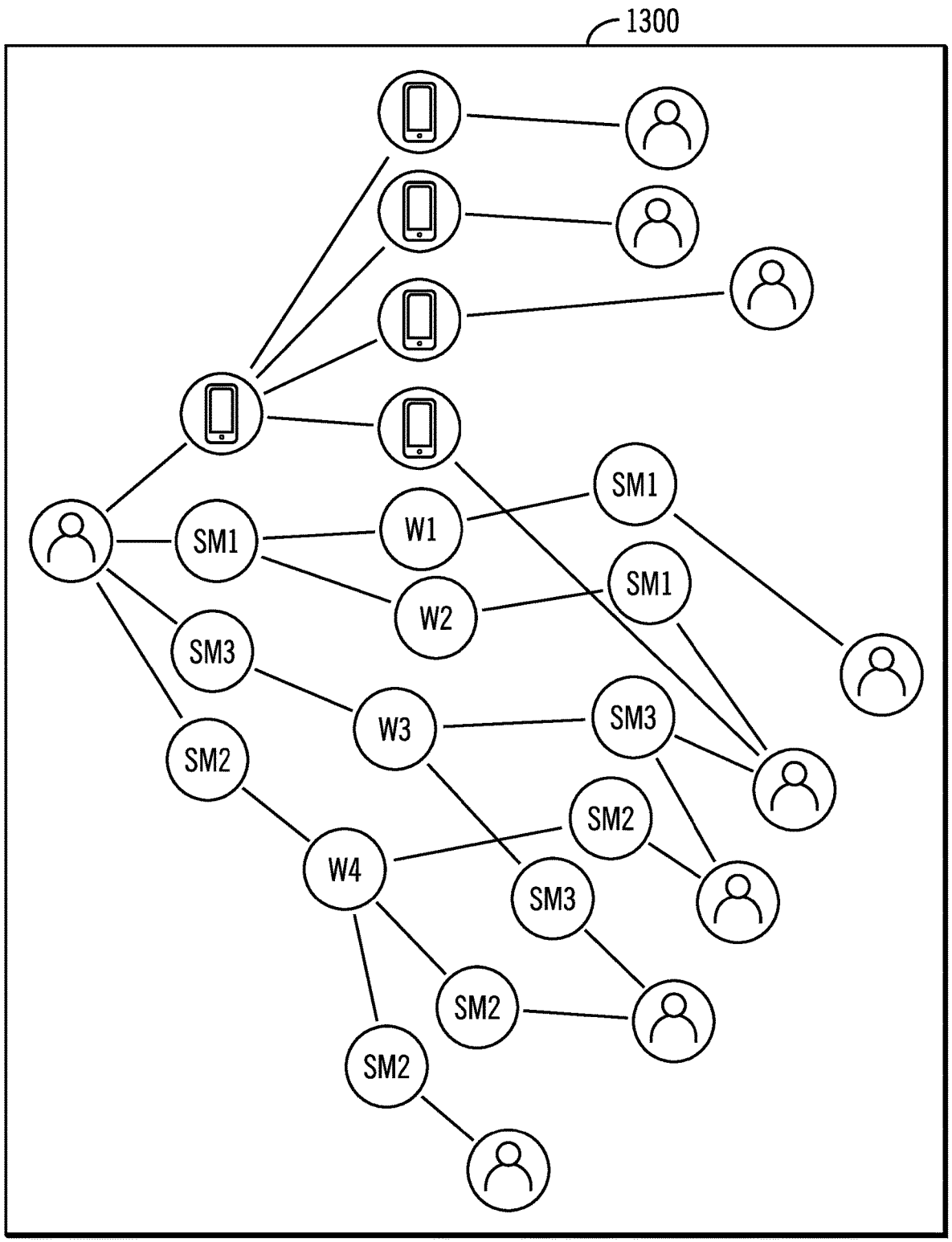
FIG. 13 illustrates an example graph created by a user in accordance with certain embodiments.

FIG. 13 illustrates an example graph 1300 created by a user in accordance with certain embodiments. In certain embodiments, the user accesses a subset of the data and uses that subset to aid in performing analysis. For example, if the user is locating a person, the user may look at data around that person, including who the person has been in contact with (e.g., via social media, text message, etc.). In FIG. 13, "SM" refers to social media and "W" refers to a website. The graph 1300 may represent a portion of the information on the entire graph, but the graph 1300 is representative of the kind of relationships the user may be analyzing.

FIG. 14 illustrates an example per-user patterns structure 1400 in accordance with certain embodiments. The per-user patterns structure 1400 indicates that patterns 1, 2, and 3 were found in the graph 1300, with pattern 1 occurring 4 times in the graph, pattern 2 occurring 5 times in the graph, and pattern 3 occurring 15 times in the graph. The highlight query generator 130, using the graph 1300 that the user has open, accesses the global patterns structure 1100 and uses the global patterns structure 1100 to identify and count the occurrences of patterns in the graph 1300. In certain embodiments, the highlight query generator 130 generates the per-user patterns structure 1400 based on the graph 1400 and other graphs that the user has created or used.

The highlight query generator 130 uses the overall occurrences of the patterns in the of data of the global patterns frequency structure 1200 and the occurrences of the patterns in the per-user patterns structure 1400 to calculate which patterns are significant for the user. This determination may be performed with a variety of statistical techniques.

Figure 15:
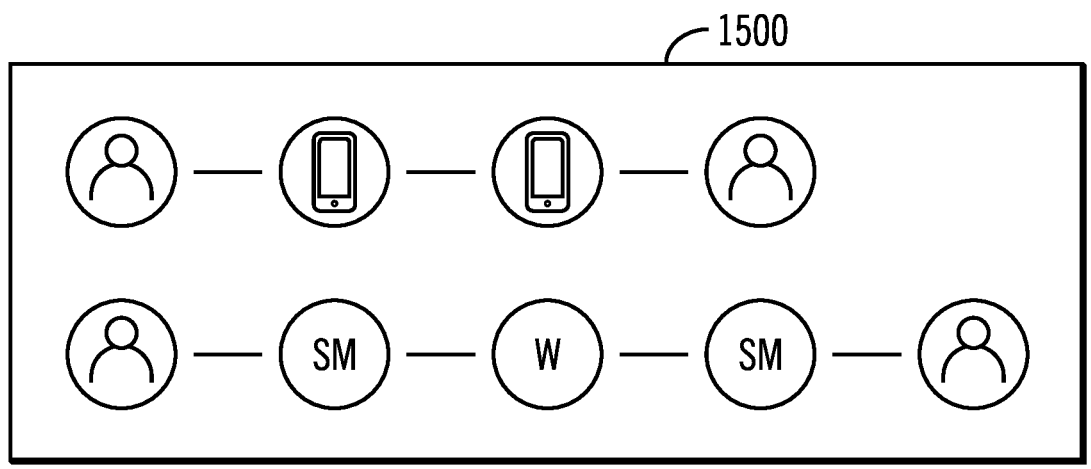
FIG. 15 illustrates patterns that are found to be significant in accordance with certain embodiments.

The highlight query generator 130 identifies one or more patterns in the data that the user is more interested in than others. FIG. 15 illustrates patterns 1500 that are found to be significant in accordance with certain embodiments. The patterns 1500 are designated as highlight queries in this example.

Then, the next time the user adds node or an edge to a graph that is the start of one of these patterns, the highlight query generator 130 may provide possible nodes and edges for completing these patterns. In certain embodiments, the possible nodes and edges may be automatically added to the graph. In other embodiments, the user is prompted on which of the possible nodes and edges are to be added to the graph. In additional embodiments, the added node or edge may be used as a seed for further actions, such as seeds for further highlight queries.

Figure 16:
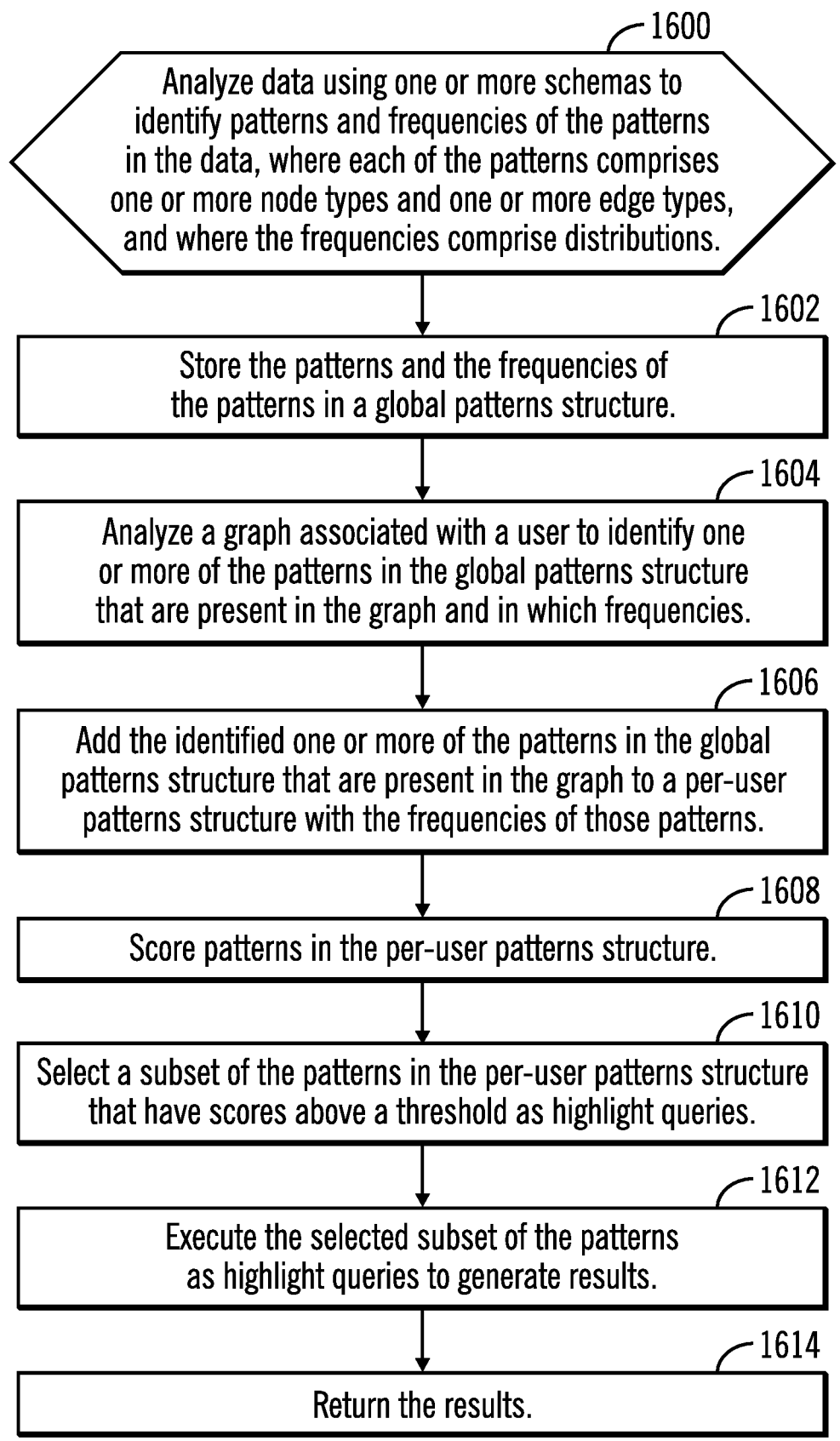
FIG. 16 illustrates, in a flowchart, operations for generating highlight queries and executing those highlight queries in accordance with certain embodiments.

FIG. 16 illustrates, in a flowchart, operations for generating highlight queries and executing those highlight queries in accordance with certain embodiments. Control begins at block 1600 with the highlight query generator 130 analyzing data using one or more schemas to identify patterns and frequencies of the patterns in the data, where each of the patterns comprises one or more node types and one or more edge types, and where the frequencies comprise frequencies. In block 1602, the highlight query generator 130 stores the identified patterns and the frequencies of the patterns in a global patterns structure. In block 1604, the highlight query generator 130 analyzes a graph associated with a user to identify one or more of the patterns in the global patterns structure that are present in the graph and in which frequencies. In block 1606, based on the analysis of the graph, the highlight query generator 130 updates a per-user patterns structure for the user and for this graph. In block 1608, the highlight query generator 130 scores each of the patterns in the per-user patterns structure. In block 1610, the highlight query generator 130 selects a subset of the one or more patterns that have scores above a threshold as highlight queries. In block 1612, the highlight query generator 130 executes the selected subset of one or more patterns as highlight queries to generate results. In block 1614, the highlight query generator 130 returns the results.

Figure 17:
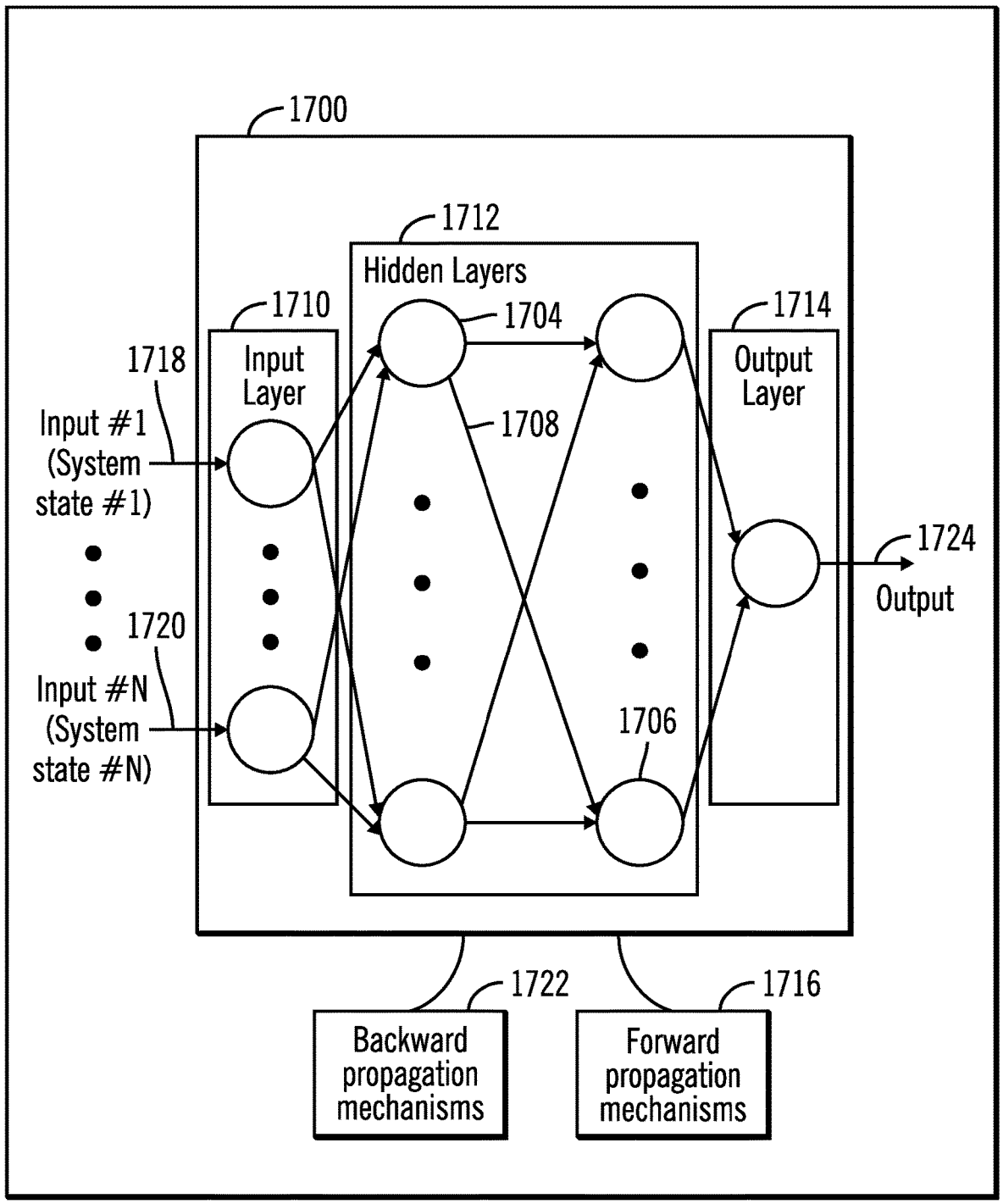
FIG. 17 illustrates, in a block diagram, details of a machine learning module in accordance with certain embodiments.

FIG. 17 illustrates, in a block diagram, details of a machine learning module 1700 in accordance with certain embodiments. In certain embodiments, the machine learning module 140 is implemented using the components of the machine learning module 1700.

The machine learning module 1700 may comprise a neural network with a collection of nodes with links connecting them, where the links are referred to as connections. For example, FIG. 17 shows a node 1704 connected by a connection 1708 to the node 1706. The collection of nodes may be organized into three main parts: an input layer 1710, one or more hidden layers 1712, and an output layer 1714.

The connection between one node and another is represented by a number called a weight, where the weight may be either positive (if one node excites another) or negative (if one node suppresses or inhibits another). Training the machine learning module 1700 entails calibrating the weights in the machine learning module 1700 via mechanisms referred to as forward propagation 1716 and backward propagation 1722. Bias nodes that are not connected to any previous layer may also be maintained in the machine learning module 1700. A bias may be described as an extra input of 1 with a weight attached to it for a node.

In forward propagation 1716, a set of weights are applied to the input data 1718 . . . 320 to calculate the output 1724. For the first forward propagation, the set of weights may be selected randomly or set by, for example, a system administrator. That is, in the forward propagation 1716, embodiments apply a set of weights to the input data 1718 . . . 1720 and calculate an output 1724.

In backward propagation 1722 a measurement is made for a margin of error of the output 1724, and the weights are adjusted to decrease the error. Backward propagation 1722 compares the output that the machine learning module 1700 produces with the output that the machine learning module 1700 was meant to produce, and uses the difference between them to modify the weights of the connections between the nodes of the machine learning module 1700, starting from the output layer 1714 through the hidden layers 1712 to the input layer 1710, i.e., going backward in the machine learning module 1700. In time, backward propagation 1722 causes the machine learning module 1700 to learn, reducing the difference between actual and intended output to the point where the two come very close or coincide.

The machine learning module 1700 may be trained using backward propagation to adjust weights at nodes in a hidden layer to produce adjusted output values based on the provided inputs 1718 . . . 1720. A margin of error may be determined with respect to the actual output 1724 from the machine learning module 1700 and an expected output to train the machine learning module 1700 to produce the desired output value based on a calculated expected output. In backward propagation, the margin of error of the output may be measured and the weights at nodes in the hidden layers 1712 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning module 1700 is configured to repeat both forward and backward propagation until the weights of the machine learning module 1700 are calibrated to accurately predict an output.

The machine learning module 1700 implements a machine learning technique such as decision tree learning, association rule learning, artificial neural network, inductive programming logic, support vector machines, Bayesian models, etc., to determine the output value 1724.

In certain machine learning module 1700 implementations, weights in a hidden layer of nodes may be assigned to these inputs to indicate their predictive quality in relation to other of the inputs based on training to reach the output value 1724.

With embodiments, the machine learning module 1700 is a neural network, which may be described as a collection of "neurons" with "synapses" connecting them.

With embodiments, there may be multiple hidden layers 1712, with the term "deep" learning implying multiple hidden layers. Hidden layers 1712 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 1716 and the backward propagation 1722.

In backward propagation 1722, embodiments measure the margin of error of the output and adjust the weights accordingly to decrease the error.

Neural networks repeat both forward and backward propagation until the weights are calibrated to accurately predict the output 1724.

In certain embodiments, the inputs to the machine learning module 1700 are per user per graph pattern frequencies, and the outputs of the machine learning module 1700 are thresholds. This allows for creating a list of highlight queries using the thresholds. In certain embodiments, the machine learning model may be refined based on whether the outputted recommendations, once taken, generate positive outcomes.

In certain embodiments, user graphs are stored and it may take time to build up a set of highlight queries for a user. In other embodiments, by using behavioral analysis techniques, the highlight query generator 130 clusters users (e.g., using the audit logs of activity by users) to determine whether they are likely to be looking for similar information, and the highlight query generator 130 clusters their graphs in the analysis of highlight queries.

In certain embodiments, the highlight query generator 130 analyzes data to identify possible patterns and measure the frequencies that these patterns occur. When the user interacts with a subset (e.g., one or more graphs) of the total data, the highlight query generator 130 uses the subset to measure the frequency of patterns within this subset. For the patterns found in the subset, the highlight query generator 130 compares the frequencies against the expected frequency for the total data to identify significant patterns. The highlight query generator 130 uses these significant patterns to suggest possible nodes and edges to complete a graph or to suggest and build new highlight queries.

In certain embodiments, the highlight query generator 130 automatically generates highlight queries for a user (e.g., an analyst) by analyzing data in a graph (i.e., an entity network) to understand patterns in the data and frequency of those patterns across entity types.

In certain embodiments, the highlight query generator 130 analyzes the data in the graph by exploring nodes and edges surrounding an entity to identify patterns for each schema defined entity type. In certain embodiments, the global patterns structure 170 includes a set of patterns that link entities to each other, while the global patterns frequency structure 180 associates a set of statistical measures (i.e., frequencies) with each of the patterns. The highlight query generator 130 utilizes the identified patterns to analyze a set of user graphs for identifying patterns used by that user, and these patterns are stored in a per-user patterns structure 190. The highlight query generator 130 compares the frequency of the patterns in the per-user patterns structure 190 with the frequency of the patterns in the global patters frequency structure 180 to identify pattern occurrences that are statistically significant. The highlight query generator 130 defines highlight queries based on the identified pattern occurrences that are statistically significant.

Figure 18:
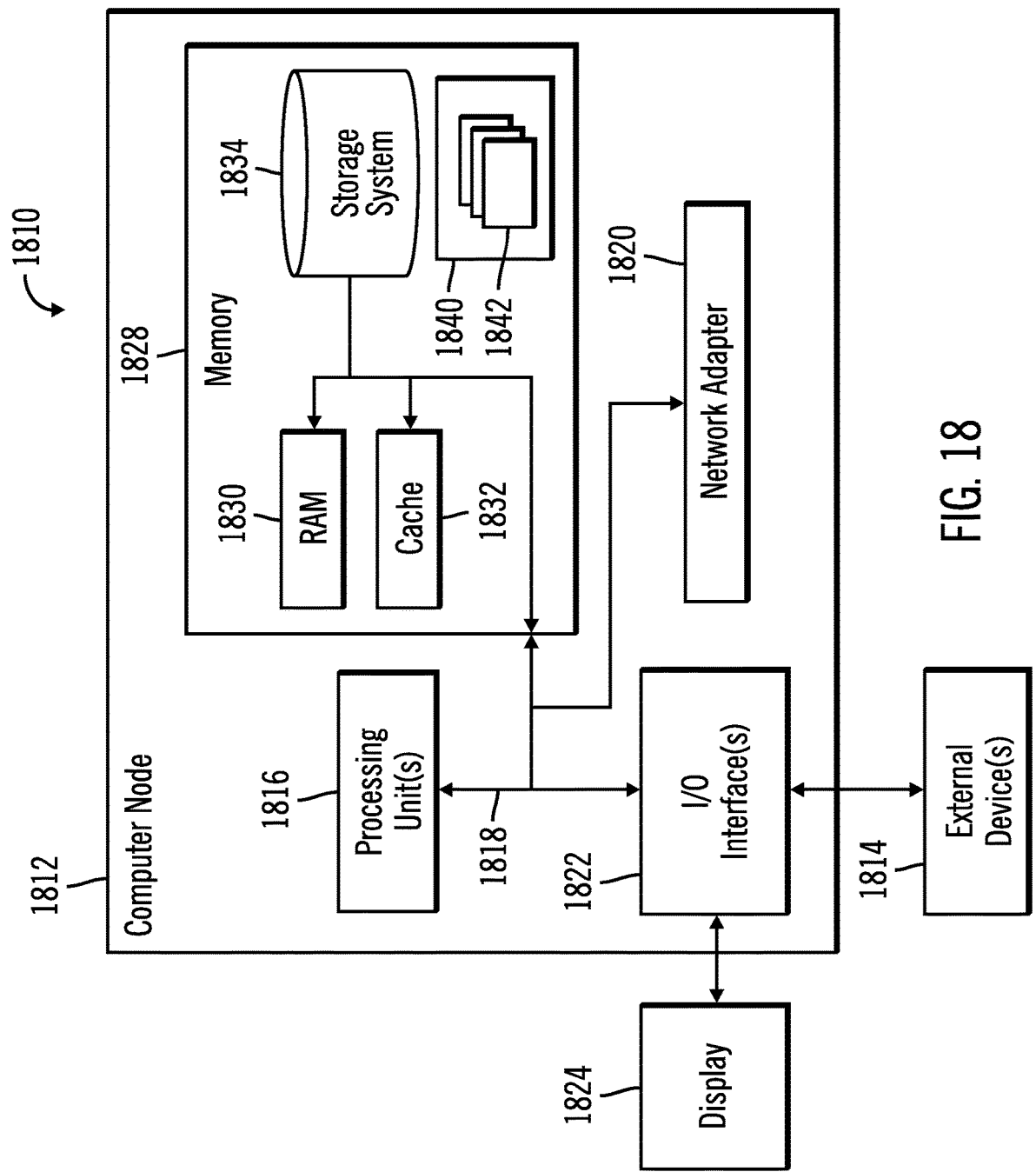
FIG. 18 illustrates a computing node in accordance with certain embodiments.

FIG. 18 illustrates a computing environment 1810 in accordance with certain embodiments. In certain embodiments, the computing environment is a cloud computing environment. Referring to FIG. 18, computer node 1812 is only one example of a suitable computing node and is not intended to suggest any limitation as to the scope of use or functionality of embodiments of the invention described herein. Regardless, computer node 1812 is capable of being implemented and/or performing any of the functionality set forth hereinabove.

The computer node 1812 may be a computer system, which is operational with numerous other general purpose or special purpose computing system environments or configurations. Examples of well-known computing systems, environments, and/or configurations that may be suitable for use with computer node 1812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1812 may be described in the general context of computer system executable instructions, such as program modules, being executed by a computer system. Generally, program modules may include routines, programs, objects, components, logic, data structures, and so on that perform particular tasks or implement particular abstract data types. Computer node 1812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 18, computer node 1812 is shown in the form of a general-purpose computing device. The components of computer node 1812 may include, but are not limited to, one or more processors or processing units 1816, a system memory 1828, and a bus 1818 that couples various system components including system memory 1828 to one or more processors or processing units 1816.

Bus 1818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1812 typically includes a variety of computer system readable media. Such media may be any available media that is accessible by computer node 1812, and it includes both volatile and non-volatile media, removable and non-removable media.

System memory 1828 can include computer system readable media in the form of volatile memory, such as random access memory (RAM) 1830 and/or cache memory 1832. Computer node 1812 may further include other removable/non-removable, volatile/non-volatile computer system storage media. By way of example only, storage system 1834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc read-only memory (CD-ROM), digital versatile disk read-only memory (DVD-ROM) or other optical media can be provided. In such instances, each can be connected to bus 1818 by one or more data media interfaces. As will be further depicted and described below, system memory 1828 may include at least one program product having a set (e.g., at least one) of program modules that are configured to carry out the functions of embodiments of the invention.

Program/utility 1840, having a set (at least one) of program modules 1842, may be stored in system memory 1828 by way of example, and not limitation, as well as an operating system, one or more application programs, other program modules, and program data. Each of the operating system, one or more application programs, other program modules, and program data or some combination thereof, may include an implementation of a networking environment. Program modules 1842 generally carry out the functions and/or methodologies of embodiments of the invention as described herein.

Computer node 1812 may also communicate with one or more external devices 1814 such as a keyboard, a pointing device, a display 1824, etc.; one or more devices that enable a user to interact with computer node 1812; and/or any devices (e.g., network card, modem, etc.) that enable computer node 1812 to communicate with one or more other computing devices. Such communication can occur via Input/Output (I/O) interfaces 1822. Still yet, computer node 1812 can communicate with one or more networks such as a local area network (LAN), a general wide area network (WAN), and/or a public network (e.g., the Internet) via network adapter 1820. As depicted, network adapter 1820 communicates with the other components of computer node 1812 via bus 1818. It should be understood that although not shown, other hardware and/or software components could be used in conjunction with computer node 1812. Examples, include, but are not limited to: microcode, device drivers, redundant processing units, external disk drive arrays, Redundant Array of Inexpensive Disks (RAID) systems, tape drives, and data archival storage systems, etc.

In certain embodiments, each end-user computing device 100a . . . 100n and the central computing device 120 has the architecture of computer node. In certain embodiments, one or more end-user computing devices 100a . . . 100n and/or the central computing device 120 are part of a cloud infrastructure. In certain alternative embodiments, each end-user computing device 100a . . . 100n and the central computing device 120 are not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 19:
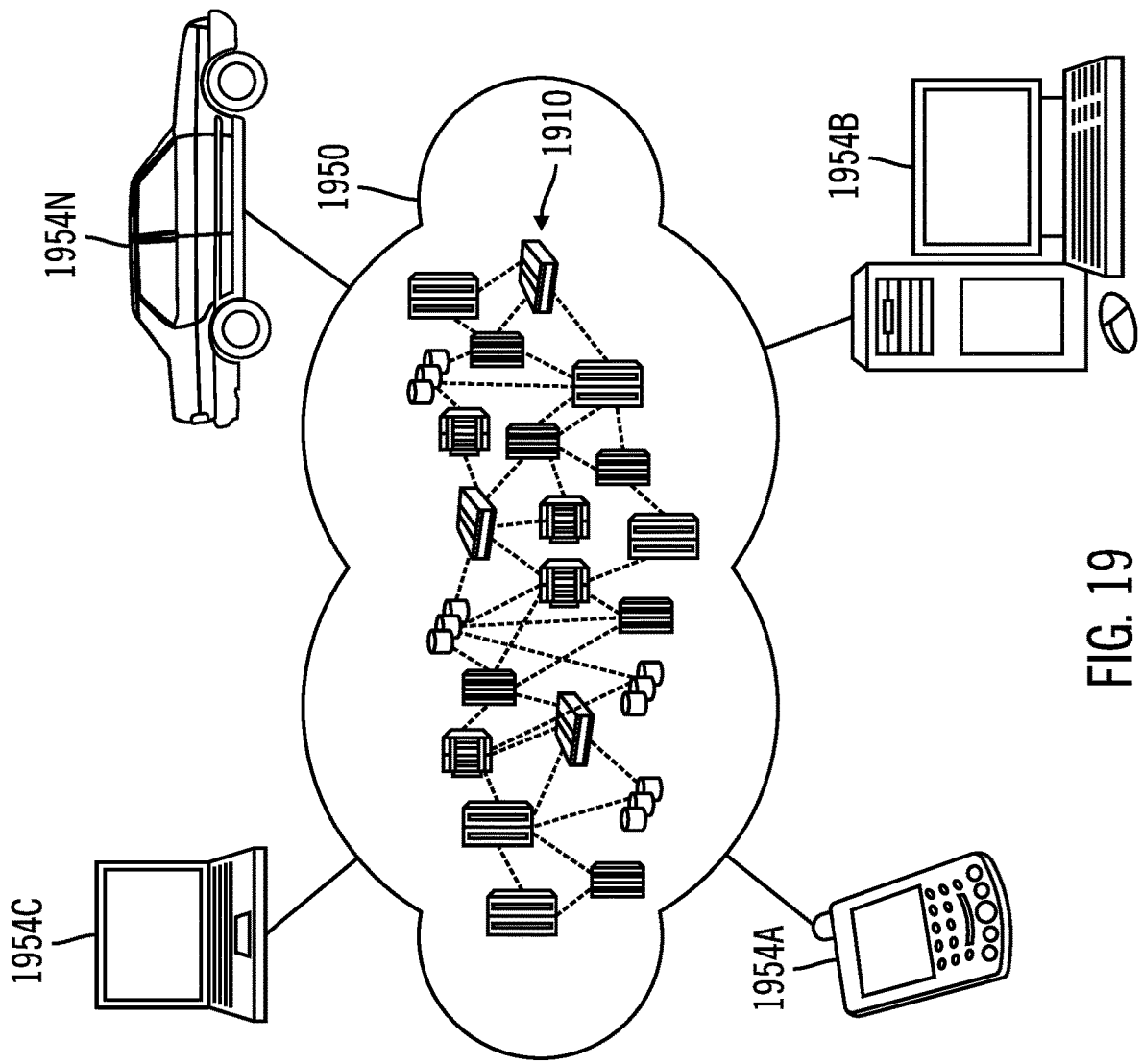
FIG. 19 illustrates a cloud computing environment in accordance with certain embodiments.

Referring now to FIG. 19, illustrative cloud computing environment 1950 is depicted. As shown, cloud computing environment 1950 includes one or more cloud computing nodes 1910 with which local computing devices used by cloud consumers, such as, for example, personal digital assistant (PDA) or cellular telephone 1954A, desktop computer 1954B, laptop computer 1954C, and/or automobile computer system 1954N may communicate. Nodes 1910 may communicate with one another. They may be grouped (not shown) physically or virtually, in one or more networks, such as Private, Community, Public, or Hybrid clouds as described hereinabove, or a combination thereof. This allows cloud computing environment 1950 to offer infrastructure, platforms and/or software as services for which a cloud consumer does not need to maintain resources on a local computing device. It is understood that the types of computing devices 1954A-N shown in FIG. 19 are intended to be illustrative only and that computing nodes 1910 and cloud computing environment 1950 can communicate with any type of computerized device over any type of network and/or network addressable connection (e.g., using a web browser).

Referring now to FIG. 20, a set of functional abstraction layers provided by cloud computing environment 1950 (FIG. 19) is shown. It should be understood in advance that the components, layers, and functions shown in FIG. 20 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and automatically generating highlight queries 2096.

Thus, in certain embodiments, software or a program, implementing automatically generating highlight queries in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
    analyzing data using one or more schemas to identify patterns and frequencies of the patterns in the data, wherein each of the one or more schemas describes node types, edge types, and allowed edges between nodes, and wherein each of the patterns comprises one or more of the node types and one or more of the edge types;
    storing the patterns and the frequencies of the patterns in a global patterns structure;
    in response to input, creating a graph;
    analyzing the graph to identify one or more of the patterns in the global patterns structure that are present in the graph and in which frequencies;
    adding the identified patterns in the global patterns structure that are present in the graph to a per-user patterns structure with the frequencies of those identified patterns;
    scoring the identified patterns in the per-user patterns structure;
    selecting a subset of the identified patterns in the per-user patterns structure that have scores above a threshold as highlight queries;
    executing the selected subset of the identified patterns as highlight queries to generate results; and
    returning the results.

2. The computer-implemented method of claim 1, wherein a pattern having a score above the threshold is deemed statistically significant.

3. The computer-implemented method of claim 1, wherein the operations further comprise:
    receiving updated data;
    analyzing changed portions of the updated data using the one or more schemas to identify updates to previously found patterns and frequencies of the previously found patterns; and
    storing the updates to the previously found patterns and the frequencies of the previously found patterns in the global patterns structure.

4. The computer-implemented method of claim 1, wherein the threshold is determined using a machine learning module.

5. The computer-implemented method of claim 1, wherein the operations further comprise:
    in response to the graph being one of modified and deleted, updating a frequency of a pattern of the identified patterns in the per-user patterns structure.

6. The computer-implemented method of claim 1, wherein the operations further comprise:
    providing suggestions for adding to the graph.

7. The computer-implemented method of claim 1, wherein a Software as a Service (SaaS) is configured to perform the operations of the computer-implemented method.

8. A computer program product, the computer program product comprising a computer readable storage medium having program code embodied therewith, the program code executable by at least one processor to perform operations for:
    analyzing data using one or more schemas to identify patterns and frequencies of the patterns in the data, wherein each of the one or more schemas describes node types, edge types, and allowed edges between nodes, and wherein each of the patterns comprises one or more of the node types and one or more of the edge types;
    storing the patterns and the frequencies of the patterns in a global patterns structure;
    in response to input, creating a graph;
    analyzing the graph to identify one or more of the patterns in the global patterns structure that are present in the graph and in which frequencies;
    adding the identified patterns in the global patterns structure that are present in the graph to a per-user patterns structure with the frequencies of those identified patterns;
    scoring the identified patterns in the per-user patterns structure;
    selecting a subset of the identified patterns in the per-user patterns structure that have scores above a threshold as highlight queries;
    executing the selected subset of the identified patterns as highlight queries to generate results; and
    returning the results.

9. The computer program product of claim 8, wherein a pattern having a score above the threshold is deemed statistically significant.

10. The computer program product of claim 8, wherein the program code is executable by the at least one processor to perform operations for:
    receiving updated data;
    analyzing changed portions of the updated data using the one or more schemas to identify updates to previously found patterns and frequencies of the previously found patterns; and
    storing the updates to the previously found patterns and the frequencies of the previously found patterns in the global patterns structure.

11. The computer program product of claim 8, wherein the threshold is determined using a machine learning module.

12. The computer program product of claim 8, wherein the program code is executable by the at least one processor to perform operations for:
in response to the graph being one of modified and deleted, updating a frequency of a pattern of the identified patterns in the per-user patterns structure.

13. The computer program product of claim 8, wherein the program code is executable by the at least one processor to perform operations for:
providing suggestions for adding to the graph.

14. The computer program product of claim 8, wherein a Software as a Service (SaaS) is configured to perform the operations of the computer program product.

15. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
analyzing data using one or more schemas to identify patterns and frequencies of the patterns in the data, wherein each of the one or more schemas describes node types, edge types, and allowed edges between nodes, and wherein each of the patterns comprises one or more of the node types and one or more of the edge types;
storing the patterns and the frequencies of the patterns in a global patterns structure;
in response to input, creating a graph;
analyzing the graph to identify one or more of the patterns in the global patterns structure that are present in the graph and in which frequencies;
adding the identified patterns in the global patterns structure that are present in the graph to a per-user patterns structure with the frequencies of those identified patterns;
scoring the identified patterns in the per-user patterns structure;
selecting a subset of the identified patterns in the per-user patterns structure that have scores above a threshold as highlight queries;
executing the selected subset of the identified patterns as highlight queries to generate results; and
returning the results.

16. The computer system of claim 15, wherein a pattern having a score above the threshold is deemed statistically significant.

17. The computer system of claim 15, further comprising operations for:
receiving updated data;
analyzing changed portions of the updated data using the one or more schemas to identify updates to previously found patterns and frequencies of the previously found patterns; and
storing the updates to the previously found patterns and the frequencies of the previously found patterns in the global patterns structure.

18. The computer system of claim 15, wherein the threshold is determined using a machine learning module.

19. The computer system of claim 15, further comprising operations for:
in response to the graph being one of modified and deleted, updating a frequency of a pattern of the identified patterns in the per-user patterns structure.

20. The computer system of claim 15, wherein a Software as a Service (SaaS) is configured to perform the operations of the computer system.

* * * * *